(12) United States Patent
Cazanas et al.

(10) Patent No.: US 9,219,766 B2
(45) Date of Patent: Dec. 22, 2015

(54) TELEPHONY ENABLED INFORMATION EXCHANGE

(71) Applicant: CELLCO PARTNERSHIP, Basking Ridge, NJ (US)

(72) Inventors: Carlos A. Cazanas, Bethlehem, PA (US); Phillip Anthony Leone, Frenchtown, NJ (US); Rikesh Modi, Edison, NJ (US); Kalpan Shah, Bridgewater, NJ (US); Victor Pagan, Breinigsville, PA (US)

(73) Assignee: Cellco Partnership, Basking Ridge, NJ (US)

( * ) Notice: Subject to any disclaimer, the term of this patent is extended or adjusted under 35 U.S.C. 154(b) by 94 days.

(21) Appl. No.: 13/966,235

(22) Filed: Aug. 13, 2013

(65) Prior Publication Data

US 2015/0049754 A1   Feb. 19, 2015

(51) Int. Cl.
*H04L 29/08* (2006.01)
*H04L 29/06* (2006.01)

(52) U.S. Cl.
CPC ........ *H04L 65/4023* (2013.01); *H04L 65/1013* (2013.01); *H04L 65/102* (2013.01); *H04L 67/06* (2013.01); *H04L 67/147* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 6,963,993 B1 * | 11/2005 | Semancik et al. | 714/2 |
| 2006/0153166 A1 * | 7/2006 | Kobayashi et al. | 370/352 |
| 2009/0287830 A1 * | 11/2009 | Howard | 709/228 |
| 2012/0149404 A1 * | 6/2012 | Beattie et al. | 455/466 |
| 2013/0115929 A1 * | 5/2013 | Morifuku | 455/414.1 |

* cited by examiner

*Primary Examiner* — Hassan Phillips
*Assistant Examiner* — Ayanah George

(57) ABSTRACT

Systems and methods for IMS telephony enabled information exchange are disclosed. In some implementations, a transfer request to transfer a file from a first user to a second user is received at a IMS gateway and during an ongoing telephone call established between a first device associated with the first user and a second device associated with the second user. The second user on the ongoing telephone call is identified at the IMS gateway. Upon identifying the second user and responsive to the transfer request, the file is transferred from the first user to the second user.

20 Claims, 4 Drawing Sheets

TELEPHONY ENABLED INFORMATION EXCHANGE

BACKGROUND

Sometimes, participants in telephone calls may wish to exchange electronic files with one another. For example, a recruiter may telephone a candidate to describe a job opportunity to the candidate, and the candidate may wish to transmit his/her resume to the recruiter. In order to transmit the resume, the candidate may need to write down the recruiter's email address and send an email to the recruiter, which may be a cumbersome and error prone process. For example, the candidate may mistype the recruiter's email address. As the foregoing illustrates, a new approach for exchanging information during a telephone call may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The subject technology provides techniques for exchanging information during an ongoing telephone call. Advantageously, according to some implementations of the subject technology, a first party in an ongoing telephone call may transmit file(s) to a second party in the ongoing telephone call using an intuitive process that is not cumbersome and error prone. In some examples, the first party may not need to know or rewrite any of the second party's contact information (e.g., email address, social network messaging address, etc.) to transmit files to the second party.

According to some implementations, an IMS gateway receives, from a computing device (e.g., a desktop computer) of the first party in the ongoing telephone call, a request to transfer a file from the computing device to the second party. The IMS gateway identifies the second party based on an identification of the first party and an identification of the ongoing telephone call (e.g., from an IMS telephony server). The IMS gateway transfers the file to the second party based on a default file transfer technique or a file transfer technique specified by the second party. As used herein, the abbreviation IMS may refer to IP Multimedia Subsystem and the abbreviation IP may refer to Internet Protocol.

Figure 1:
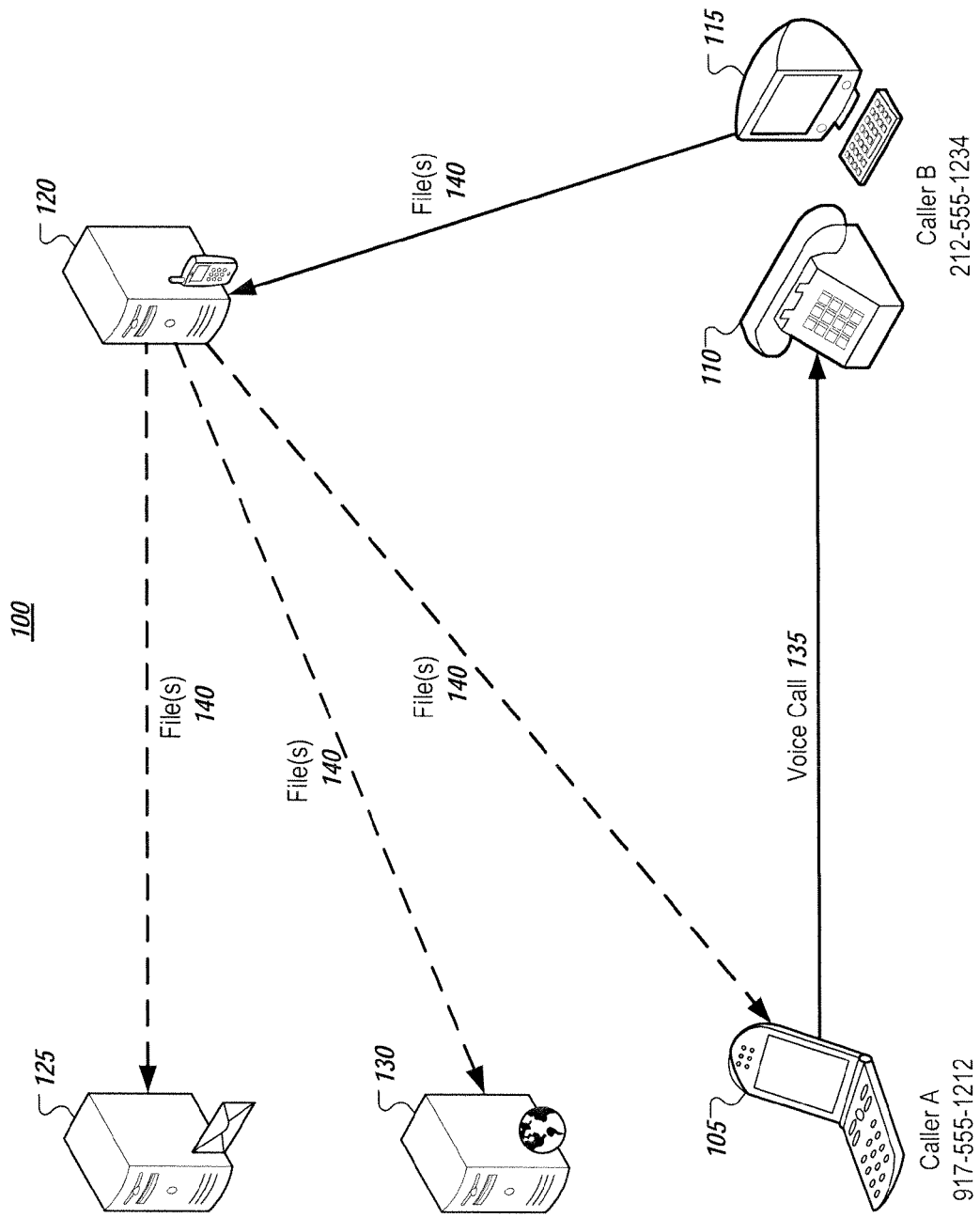
FIG. 1 illustrates an exemplary system for transferring files during an ongoing telephone call.

FIG. 1 illustrates an exemplary system 100 for transferring files during an ongoing telephone call. As shown, the system 100 includes telephones 105 and 110, a computer 115, an IP Multimedia Subsystem (IMS) gateway 120, a mail server 125, and a web server 130. The telephones 105 and 110 are able to access a public switched telephone network (PSTN), a Voice over Internet Protocol (VoIP) network, or a cellular network. The computer 115, IMS gateway 120, mail server 125, and web server 130 are connected to one another via a network. The network may include the Internet, a wireless network, a wired network, a local area network (LAN), or a wide area network (WAN). The networks listed above may be interconnected with one another. The IMS gateway 120 also has a connection to an IMS private network. The IMS private network may include records of a telephony service, for example, past and ongoing call records or customer billing records.

According to some implementations, an IMS voice call 135 is initiated between two callers, Caller A and Caller B. For example, Caller A, having telephone number 917-555-1212 and using telephone 105, telephones Caller B, having telephone number 212-555-1234 at telephone 110. At the time the IMS voice call 135 is initiated, Caller B may not be familiar with Caller A and may not have Caller A in his/her contact list or know Caller A's email address or social networking (e.g., Facebook® or LinkedIn®) information. In one example, Caller A is a recruiter "cold call" telephoning Caller B, a job candidate, regarding a job opportunity. Upon receiving the call, Caller B may decide that he/she is interested in the job opportunity and wish to share his/her resume, cover letter, and/or photograph with Caller A to apply for the job opportunity. The resume, cover letter, and/or photograph are files stored on computer 115, which may be a desktop computer, a laptop computer, a tablet computer, a personal digital assistant, a mobile phone, etc. In some implementations, the computer 115 and the telephone 110 are the same device and the files are stored on the device. In some implementations, as illustrated, the computer 115 and the telephone 110 are separate devices.

To share the resume, cover letter, and/or photograph with recruiter Caller A, job candidate Caller B selects the associated file(s) 140 on the computer 115 and forwards the file(s) to the IMS gateway 120. The Caller B may also forward the telephony account of Caller B to the IMS gateway 120. Alternatively or additionally, the IMS gateway 120 may be previously informed of the telephone account of the Caller B by virtue of the Caller B registering for the services rendered by IMS gateway 120.

The Caller B may right click on the file(s) and select an option to "share with caller on my phone." Alternatively, Caller B may instantiate an application on the computer 115 for accessing the telephony account of Caller B and select the file(s) from the application, for example, via a menu in the application or by dragging and dropping the file(s) 140 into a selection box. The IMS gateway 120 receives the file(s) 140 for transmission to the party speaking with Caller B in the ongoing voice call 135 (Caller A). The file(s) 140 may be received in association with the telephony account of Caller B or may be associated at the IMS gateway 120 with the telephony account of Caller B.

Upon receiving the file(s) 140, the IMS gateway 120 determines a telephone number of the party speaking with Caller B (Caller A; 917-555-1212) via the ongoing IMS voice call 135. The telephone number may be determined using a caller identification (ID) service. In some examples, the IMS gateway 120 is associated with a IMS telephony service provider of Caller A and/or Caller B and, thus, has access to telephone call in session data. For example, the IMS gateway 120 may be coupled with IMS telephony server(s) that connect parties engaging in telephone calls and may receive the telephone call data from the IMS telephony server(s). More specifically, the IMS gateway 120 may send, to the IMS telephony server(s), a telephone ID (e.g., telephone number 212-555-1234) of Caller B and ask the telephony server(s) for the telephone ID and network ID such as public IP address of the party connected with Caller B (Caller A). The IMS telephony server(s) may provide, to the IMS gateway 120, the telephone ID (e.g., telephone number 917-555-1212) of Caller A. The IMS gateway 120 receives permission from Caller A and Caller B to use their telephone number(s) for transmitting information during ongoing telephone calls, and either Caller A or Caller B may withdraw such permission at any time. For example, a Caller A or Caller B may provide their permission when registering for their telephone service with a IMS telephony service provider associated with the IMS gateway 120 or may provide or remove their permission by accessing their account(s) with the IMS telephony service provider on an account management webpage, mobile phone application, or tablet computer application of the IMS telephony service provider. In some implementations, Caller A or Caller B provide their permission when registering with the IMS gateway 120, for example, using the techniques described below. The IMS telephony server(s) may reside, for example, within the IMS private network.

Upon determining the telephone number of the party speaking with Caller B (e.g., Caller A; 917-555-1212), the IMS gateway 120 determines whether the telephone number of the party speaking with Caller B (Caller A; 917-555-1212) is associated with a preferred file transfer technique. For example, Caller A may have an account with a IMS telephony service provider (e.g., Verizon®) associated with the IMS gateway 120 and may have specified a preferred file transfer technique in the account. The account with the IMS telephony service provider associated with the IMS gateway 120 may be opened when the user registers for telephone service with the IMS telephony service provider. For example, the user may receive login information (e.g., a username and password) for managing his/her account (e.g., making payment, setting communication preferences, etc.) through a web browser, mobile phone, or tablet computer interface when the user registers for the telephone services. Alternatively, the user may register to access his/her account with the IMS telephony service using the web browser, mobile phone, or tablet computer interface after registering for the telephone service by providing his/her telephone number or account number to a web interface.

The preferred file transfer technique may include one or more of transmitting files to a specified computing device (e.g., mobile phone, laptop computer, etc.), transmitting files to a specified email address, storing the transmitted files in an online drive (e.g., Google Drive® or Amazon Cloud Drive®), and/or sending the transmitted files via a message in a social networking service. In some cases, the telephone number of Caller A may not be associated with a preferred file transfer technique. For example, Caller A may lack an account with the IMS gateway 120, may have neglected to notify the IMS gateway 120 of his/her telephone number, or may have neglected to specify the preferred file transfer technique.

If the telephone number of Caller A is associated with the preferred file transfer technique, the IMS gateway 120 transfers the file(s) 140 to Caller A according to the preferred file transfer technique. For example, the file(s) 140 may be transmitted to the mail server 125 for emailing to an email address of Caller A. Alternatively or additionally, the file(s) 140 may be transmitted to the web server 130 for storage in the online drive. Alternatively or additionally, the file(s) 140 may be pushed to the telephone 105 of Caller A, if the telephone is a smartphone capable of receiving the file(s) 140.

If the telephone number of Caller A is not associated with the preferred file transfer technique, a default file transfer technique may be used to transfer the file(s) 140 to Caller A. In the default file transfer technique, the IMS gateway 120 may determine whether the telephone 105 being used by Caller A to access the IMS voice call 135 is capable of receiving the file(s) 140. The IMS gateway 120 may send a message to the telephone 105 asking the telephone 105 whether it is capable of receiving the file(s) 140 or whether the telephone 105 is a smartphone. In response to the message, the IMS gateway 120 may receive a response from the telephone 105. The telephone 105 may be capable of receiving the file(s) 140 if the telephone 105 is a smartphone and incapable of receiving the file(s) 140 otherwise. If the telephone 105 is capable of receiving the file(s) 140, the IMS gateway 120 pushes the file(s) 140 to the telephone 105. If the telephone 105 is incapable of receiving the file(s) 140, the file(s) 140 may be stored at the web server 130 in association with a password. The password may have a limited life expectancy. For example, the password may be only used once to access the file(s) 140. The password may be sent to the telephone 105 or may be accessed from a website.

A uniform resource locator (URL) for entering the password and accessing the file(s) 140 may be transmitted to the telephone 105 of Caller A via a text or a voice message. In some examples, the text message is used if the telephone 105 of Caller A is able to receive short messaging service (SMS) messages and the voice message is used otherwise. The password for accessing the file(s) 140 at the web server 130 may expire a certain time period (e.g., one day or one week) after the text or the voice message is transmitted to the telephone 105. Furthermore, the file(s) 140 may be deleted from the web server 130 after the expiration of the certain time period or after Caller A accesses the file(s) 140 and downloads the file(s) 140 to his/her computing device.

In some examples, Caller B may be notified, for example, via email or SMS, when Caller A accesses the file(s) 140 from the web server 130 or when the file(s) 140 are deleted from the web server 130. As a result, if Caller A fails to access the file(s) 140 from the web server, for example, if Caller A was calling from a telephone (e.g., a pay phone or a borrowed telephone) to which Caller A does not ordinarily have access or Caller A neglects to access the file(s) 140, Caller B may attempt to transmit the file(s) 140 to Caller A using another approach (e.g., by obtaining Caller A's email address).

In some examples, Caller B may be notified via email or SMS, if an error occurs in the transmission of the file(s) 140 or if the file(s) 140 cannot be transmitted to Caller A. This may happen if Caller A is calling using a telephone without a callback number or with a telephone number to which voice or SMS messages cannot be transmitted cheaply (e.g., an international long distance telephone number).

Some examples of the subject technology are described herein with respect to a recruiter communicating with a job candidate. However, the subject technology may be used in other circumstances. For example, a customer calling an automobile repair shop may transmit photograph(s) of a damaged automobile to the shop during the call, so that the shop may estimate the cost for the repairs. An attorney drafting a contract for a client may telephone the client to discuss the contract and, after making the changes proposed by the client, transmit the contract to the client using the techniques described herein to obtain the client's approval of the changes during the call.

Also, the subject technology may be implemented with any type of voice call, not necessarily a telephone call. For example, in some cases, a computer-to-computer Voice over Internet Protocol (VoIP) call (e.g., Skype® to Skype®) may be used in place of a telephone call. In some cases, a computer-to-telephone call using VoIP technology (e.g., Skype®) at the computer and public switched telephone network (PSTN) or cellular technology at the telephone may be used in place of the telephone call.

Figure 2:
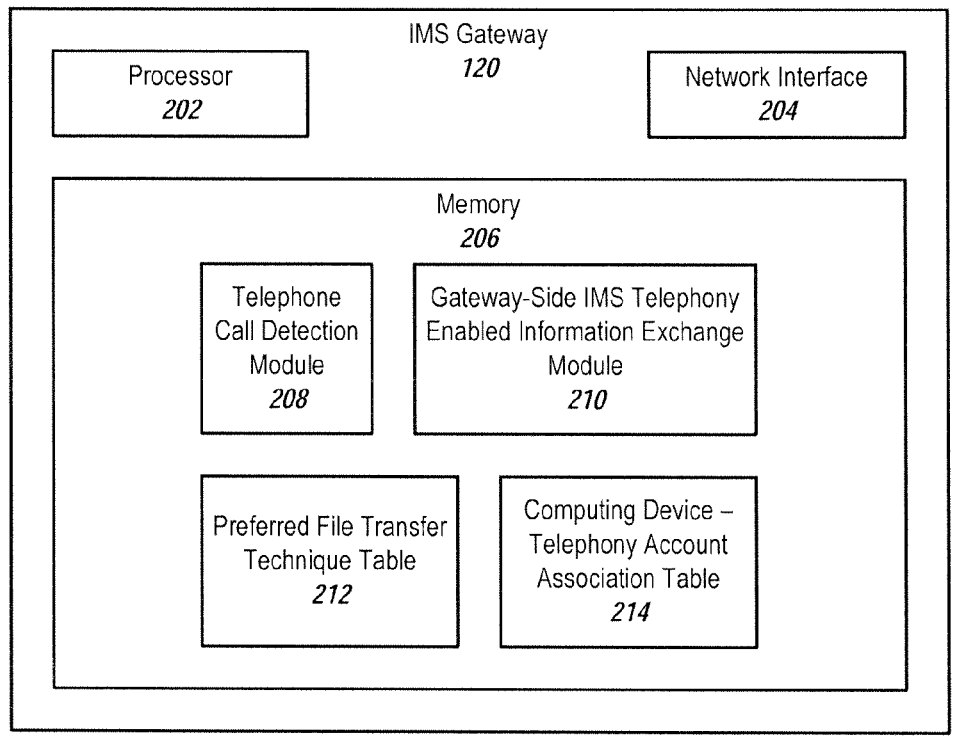
FIG. 2 illustrates in more detail an exemplary IP Multimedia Subsystem (IMS) gateway shown in the system of FIG. 1.

FIG. 2 illustrates in more detail the exemplary IMS gateway 120 shown in the system 100 of FIG. 1. While the IMS gateway 120 is illustrated as a single machine, the IMS gateway 120 may include multiple machines and may be implemented, for example, as a server farm. As shown, the IMS gateway 120 includes a processor 202, a network interface 204, and a memory 206. The processor 202 is configured to execute instructions stored in a machine-readable medium, for example, the memory 206. While a single processor 202 is illustrated, the IMS gateway 120 may include a single processor 202 or multiple processors 202. The network interface 204 includes an interface for transmitting and/or receiving data in a network, for example, a wired network, a wireless network, a local area network, or a wide area network, for example, a cellular network. The network interface 204 may include one or more network interface controllers (NICs). The memory 206 stores data and/or instructions. As shown, the memory 206 stores a telephone call detection module 208, a gateway telephony enabled information exchange module 210, a preferred file transfer technique table 212, and a computing device—telephony account association table 214.

The telephone call detection module 208 may store software code. When executed by the processor 202, the telephone call detection module 208 may cause the processor 202 to receive an input identifying a IMS telephony account (e.g., the telephony account of Caller B in FIG. 1) and to determine, based on the received input, another telephony account that is engaging in an ongoing telephone call (e.g., IMS voice call 135) with the input IMS telephony account. In some implementations, the input may be a file received at the IMS gateway 120 from a computing device (e.g., computer 115). The computing device may be logged into a telephony account access application for the telephony account. The telephony account access application may be accessible via a webpage of the telephony service provider and may include an interface for carrying out the techniques described herein as well as an interface for paying a telephony bill and/or making changes to a telephony account, such as purchasing a new device or changing a calling plan. The file may be received at the IMS gateway 120 for transmission to another user using the techniques described herein.

Alternatively, the file may be received from a computing device (e.g., a laptop or desktop computer) that is not logged into a telephony account coupled with an identifier of the computing device, for instance, a Media Access Control (MAC) address of the computing device. The processor 202 may associate the computing device with a telephony account by a lookup in the Computing Device—Telephony Account Association Table 214, which may store a mapping of computing device(s) to telephony account(s). The computing devices may include computing devices that are configured to make telephone calls (e.g., mobile phones) and computing devices that are not configured to make telephone calls (e.g., tablet computers, laptop computers, or desktop computers).

In some cases, the IMS gateway 120 executing the telephone call detection module 208 may not determine the telephony account engaging in the ongoing telephone call with the input telephony account based on identifying information received from a device associated with the input telephony account. Instead, the IMS gateway 120 may access a network or machine(s) of a IMS telephony service provider that facilitates the ongoing telephone call to determine the identity of the parties in the ongoing telephone call. In some examples, the IMS gateway 120 is part of the IMS telephone network and/or is directly connected to the machine(s) of the IMS telephony service provider.

The gateway-side IMS telephony enabled information exchange module 210 may store software code. When executed by the processor 202, the gateway-side IMS telephony enabled information exchange module 210 may cause the processor 202 to receive, during an ongoing IMS telephone call established between a first device associated with a first user (e.g., telephone 110 of Caller B) and a second device associated with a second user (e.g., telephone 105 of Caller A), a transfer request to transfer a file (e.g., file(s) 140) from a computing device of the first user (e.g., computer 115 of Caller B) to the second user. The computing device of the first user may be either the same as or different from the first device associated with the first user. The gateway-side IMS telephony enabled information exchange module 210 may cause the processor 202 to identify the second user on the ongoing telephone call, for example, by invoking the telephone call detection module 208. The gateway-side IMS telephony enabled information exchange module 210 may cause the processor 202 to, upon identifying the second user and responsive to the transfer request, transfer the file from the computing device of the first user to the second user. For instance, the file may be transferred (e.g., pushed) to the second device associated with the second user.

In some implementations, the processor 202 of the IMS gateway 120 determines whether the second user is associated with a preferred file transfer technique. The preferred file transfer technique may be, for example, one of transmitting the file to a specified device, transmitting the file to a specified email address, transmitting the file to a specified messaging address within a social networking service, or storing the file in an online drive. The preferred file transfer technique of the second user may be stored, in association with the second user, in the preferred file transfer technique table 212. For example, the preferred file transfer technique table 212 may store a correspondence of telephone numbers to preferred file transfer techniques. For example, the telephone number 617-555-1111 may be associated with the preferred file transfer technique, "transmit by email to John.Doe@abc-corporation.com." The telephone number 202-555-2222 may be associated with the preferred file transfer technique "save in Google Drive® of username Jane-Sample." If the second user is associated with a preferred file transfer technique, the processor 202 may cause transmission of the file to the second user according to the preferred file transfer technique. If the second user is not associated with a preferred file transfer technique in the preferred file transfer technique table 212, the processor 202 may cause transmission of the file to the second user according to a default file transfer technique. The default file transfer technique may include, for example, sending the file to the second device of the second user.

As described herein, the preferred file transfer technique table 212 and the computing device—telephony account association table 214 are implemented as tables. However, the preferred file transfer technique table 212 and/or the computing device—telephony account association table 214 may be implemented using any other data structure or combination of data structures. For instance, the preferred file transfer technique table 212 and/or the computing device—telephony account association table 214 may be implemented using one or more of arrays, matrices, lists, tables, hash tables, nodes, etc.

Figure 3:
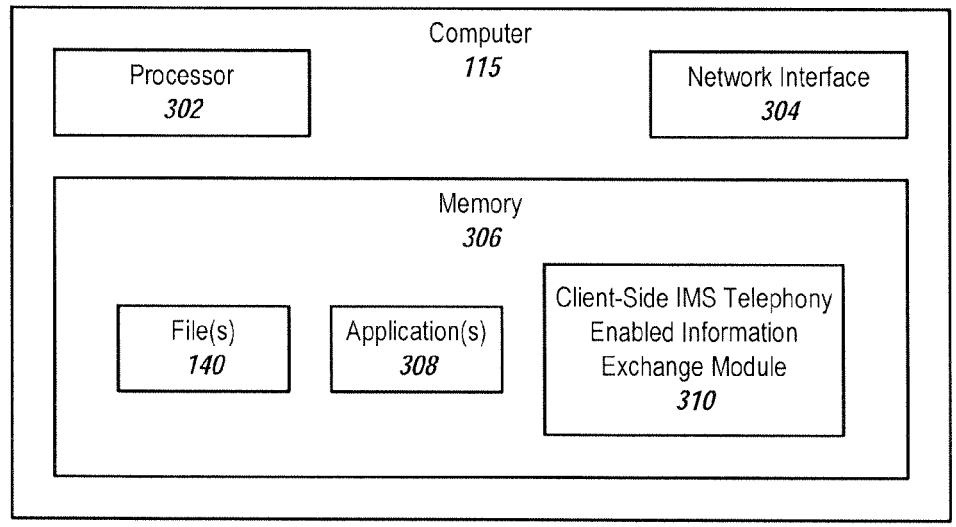
FIG. 3 illustrates in more detail an exemplary computer shown in the system of FIG. 1.

FIG. 3 illustrates in more detail the exemplary computer 115 shown in the system of FIG. 1. As shown, the computer 115 includes a processor 302, a network interface 304, and a memory 306. The processor 302 is configured to execute instructions stored in a machine-readable medium, for example, the memory 306. While a single processor 302 is illustrated, the computer 115 may include a single processor 302 or multiple processors 302. The network interface 304 includes an interface for transmitting and/or receiving data in a network, for example, a wired network, a wireless network, a local area network, or a wide area network, for example, a cellular network. The network interface 304 may include one or more network interface controllers (NICs). The memory 306 stores data and/or instructions. As shown, the memory 306 stores file(s) 140, application(s) 308, and a client-side IMS telephony enabled information exchange module 310.

The file(s) 140 may include any electronic file(s) that may be stored on a computing device. For example, the file(s) 140 may include photograph(s), video(s), audio recording(s), word processing document(s), spreadsheet(s), slide show(s), application file(s), etc. The file(s) may be transmitted from the computer 115 to the IMS gateway 120 and, later, to the second user using some of the techniques described herein.

The application(s) 308 may include code for creating or modifying the file(s) 140. The application(s) may include any application(s) that execute on a computing device, for example, web browser(s), camera application(s), audio recording or playing application(s), word processor(s), spreadsheet application(s), slide show application(s), etc. One of the application(s) 308 may be an application for accessing a telephony account of a user of the computer 115 and for associating the computer 115 with the telephony account of the user.

The client-side IMS telephony enabled information exchange module 310 may store software code. When executed by the processor 302, the client-side IMS telephony enabled information exchange module 310 may cause the processor 302 to receive an input indicating one or more file(s) 140 from among the files stored on the computer 115 and to transmit the one or more file(s) to the IMS gateway 120 for processing by the server telephony enabled information exchange module 210 of the IMS gateway 120, for example, as described above. The input indicating the one or more file(s) may include selecting the one or more file(s), dragging and dropping icon(s) representing the one or more file(s) into a window associated with the client-side IMS telephony enabled information exchange module 310, or right clicking icon(s) representing the one or more file(s) and selecting an option to "share with caller on my phone." Alternatively, any other input indicating the one or more file(s) may be used in conjunction with the subject technology.

Figure 4:
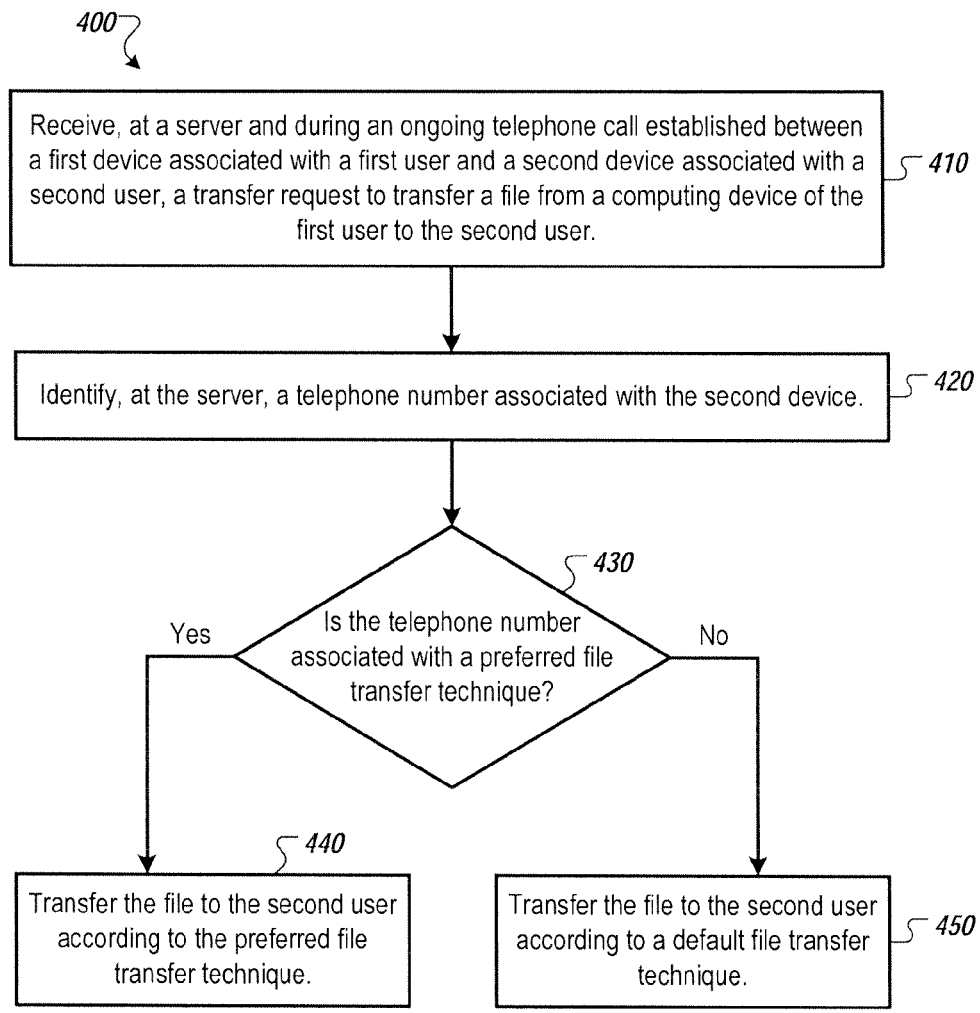
FIG. 4 illustrates an exemplary process for transferring files during an ongoing telephone call between the devices shown in the system of FIG. 1.

FIG. 4 illustrates an exemplary process 400 for transferring files during an ongoing telephone call between the devices shown in the system of FIG. 1.

At step 410, a server, which may be an IMS gateway, for example, IMS gateway 120, but is not limited as such, receives, during an ongoing telephone call established between a first device associated with a first user and a second device associated with a second user, a transfer request to transfer a file from a computing device associated with the first user to the second user. The first device and/or the second device may be telephones, but are not limited as such. The computing device associated with the first user may be any computing device, for example, a telephone, a mobile phone, a personal digital assistant (PDA), a digital music player, a tablet computer, a laptop computer, a desktop computer, etc. The computing device associated with the first user may be the same as the first device, which may be a mobile phone. Alternatively, the computing device associated with the first user may be different from the first device. For instance, the computing device may be a laptop computer of the first user and the first device may be a mobile phone, a landline phone, or a VoIP phone of the first user. The server may store an association of the computing device of the first user to a telephony account of the first user or the computing device may include and/or execute an application for accessing the telephony account.

At step 420, the server identifies a telephone number associated with the second device. In some cases, the computing device of the first user is different from the telephone of the first user and does not store the telephone number associated with the second device. Thus, in these cases, the telephone number associated with the second device may not be received from the computing device of the first user. The computing device of the first user may not transmit the telephone number associated with the second device to the server at any point in time and/or during the ongoing telephone call. Instead, the server may identify the telephony account of the first user based on information received from the computing device of the first user. For example, the first user may be logged into the telephony account of the first user at the computing device, and this information may be transmitted to the server. Alternatively, the server may store a data structure mapping identifiers (e.g., MAC addresses) computing device(s) to telephony account(s) (e.g., computing device—telephony account association table 214). The server may access machine(s) on the telephone network, such as telephony server(s), to identify the second account that is engaged in a telephone call with the first account. The second account may be identified by the telephone number.

At step 430, the server determines whether the telephone number is associated with a preferred file transfer technique. For example, the server may lookup whether the telephone number is associated with the preferred file transfer technique in a data structure on the server (e.g., preferred file transfer technique table 212). If the telephone number is associated with the preferred file transfer technique, the process 400 continues to step 440. If the telephone number is not associated with the preferred file transfer technique, the process 400 continues to step 450.

At step 440, if the telephone number is associated with the preferred file transfer technique, the server transfers the file to the second user according to the preferred file transfer technique. The preferred file transfer technique is specified by the second user, for example, in a webpage for accessing and managing a telephony account of the second user. The preferred file transfer technique may include one or more of transmitting files to a specified computing device (e.g., mobile phone, laptop computer, etc.), transmitting files to a specified email address, storing the transmitted files in an online drive (e.g., Google Drive® or Amazon Cloud Drive®), or sending the transmitted files via a message in a social networking service.

In some implementations, the preferred file transfer technique may be dependent on the availability of the receiving device. For example, the preferred file transfer technique may include pushing the file to the device if the device is connected to the network and transmitting the file to an email address if the device is not connected to the network. According to some examples, the preferred file transfer technique includes attempting to push the file to the device a certain number of times (e.g., three times) or during a certain period (e.g., two minutes) and, upon failing to push the file to the device, transmitting the file to an email address. In some cases, the preferred file transfer technique may be overridden and a default file transfer technique (e.g., as discussed in conjunction with step 450) is used instead. For example, the preferred file transfer technique may be overridden if the preferred file transfer technique is to push the file to the mobile device and the file is too large to be pushed to the mobile device.

In yet other examples, the preferred file transfer technique is dependent on the size of the file or the type of the file (e.g., image, text document, word processing document, etc.). For example, a file below a first threshold size may be pushed to the mobile device, a file between the first threshold size and a second threshold size may be transmitted to an email address, and a file larger than the second threshold size may be stored in an online drive. Alternatively, an image file may be pushed to the mobile device, a word processing document file may be transmitted via email, and any other file may be stored in the online drive. After step 440, the process 400 ends.

At step 450, if the telephone number is not associated with the preferred file transfer technique, the server transfers the file to the second user according to a default file transfer technique. The default file transfer technique may include determining, at the server, whether the second device being used by the second user is capable of receiving the file, for example, by sending a query to the second device asking whether the second device is capable of receiving the file. If the second device is capable of receiving the file, the server transmits the file to the second device. Otherwise, the server stores the file at a web server and transmits, to the second device, a message informing the second user of the stored file and including information for accessing the stored file at the web server (e.g., a username and one-time password that are set to expire after a predetermined time period). In some cases, the server may send a message to the second device to determine whether the second device is capable of receiving short messaging service (SMS) messages. If so, the information for accessing the stored file at the web server may be transmitted via SMS. Otherwise, the information for accessing the stored file at the web server may be transmitted via an audio message. After step 450, the process 400 ends.

In some implementations, the server determines that the file is received at a computing device of the second user. For example, the second user may access a web server storing the file and download the file to his/her computing device. The server provides, to a messaging address associating with the first user, a confirmation that the file was received at the computing device of the second user.

As shown by the above discussion, functions relating to IMS telephony enabled information exchange may be implemented on computers connected for data communication via the components of a packet data network. Although special purpose devices may be used, such devices also may be implemented using one or more hardware platforms intended to represent a general class of data processing device commonly used to run programming so as to implement the functions discussed above.

As known in the mobile communications field, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the content media editing. The software code is executable by the general-purpose computer that functions as one or more of the computing machines 105, 110, 115, 120, 125, or 130. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for allowing the user to edit media content to an acceptable size for successful transmission over the network, in essentially the manner performed in the implementations discussed and illustrated herein.

Figure 5:
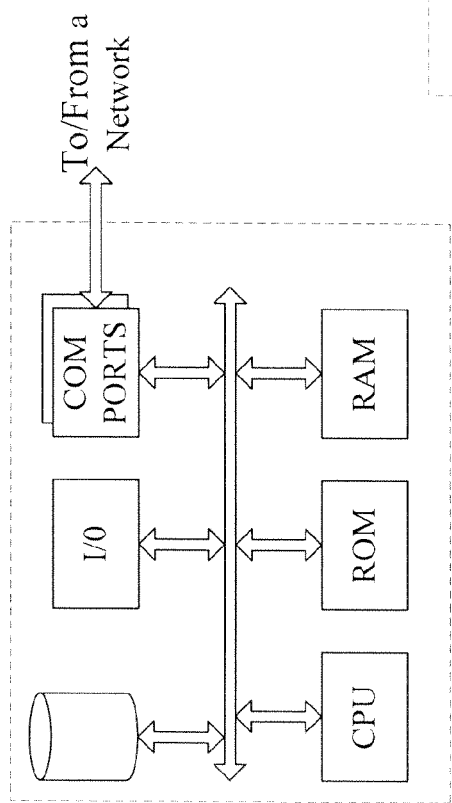
FIG. 5 illustrates an exemplary server that may be configured to function as the one or more of the computing machines such as the IMS gateway of FIG. 1.
Figure 6:
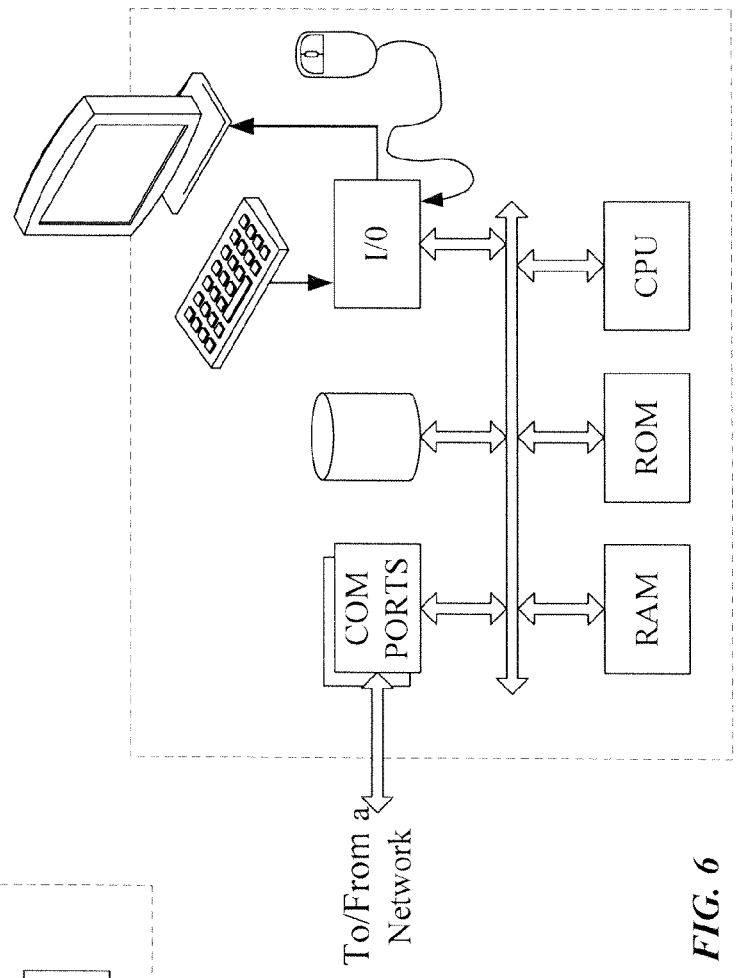
FIG. 6 illustrates an exemplary personal computer or other work station or terminal device that may be configured to function as the one or more of the computing machines such as the computer of FIG. 1.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that the general structure and general operation of such equipment as shown in FIGS. 5 and 6 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the methods of managing information about content transmission outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the memory 206 or memory 306, and the data or instructions stored therein, shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

These general and specific aspects may be implemented using a system, a method, a computer program, a computer readable medium, or an apparatus or any combination of systems, methods, computer programs, computer readable mediums, and/or apparatuses While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    receiving, at an IMS gateway and during an ongoing telephone call established between a first device associated with a first user and a second device associated with a second user, a transfer request to transfer a file from the first user to the second user;
    identifying, at the IMS gateway, the second user on the ongoing telephone call, wherein identifying the second user includes identifying a telephone number associated with the second device; and upon identifying the second user and responsive to the transfer request, transferring the file from the first user to the second user, wherein transferring the file from the first user to the second user includes:
- determining, at the IMS gateway, whether the telephone number is associated with a preferred file transfer technique;
- if the telephone number is associated with the preferred file transfer technique, transferring the file to the second user according to the preferred file transfer technique; and
- if the telephone number is not associated with the preferred file transfer technique, transferring the file to the second user according to a default file transfer technique;
- wherein the preferred file transfer technique includes:
  - attempting to push the file to a specific computing device in either a predetermined number of attempts or a predetermined amount of time; and
  - upon failing to push the file to the specified computing device, transmitting the file to an electronic messaging address.

2. The method of claim 1, wherein identifying the second user on the ongoing telephone call includes identifying, at the IMS gateway, the second user without receiving identifying information of the second user from the first user.

3. The method of claim 1, wherein the default file transfer technique includes:
- determining, at the IMS gateway, whether the second device being used by the second user to participate in the ongoing telephone call is capable of receiving the file;
- if the second device being used by the second user is capable of receiving the file, sending the file to the second device; and
- if the second device being used by the second user is incapable of receiving the file, storing the file at a web server and sending to the second device a message informing the second user of the stored file and including information for accessing the stored file at the web server.

4. The method of claim 1, wherein the preferred file transfer technique associated with the telephone number of the second user is specified within an IMS telephony account of the second user.

5. The method of claim 1, wherein identifying the telephone number associated with the second device includes:
- sending a request to an IMS telephony server for identifying the telephone number associated with a device in the ongoing telephone communication with the first user; and
- receiving, at the IMS gateway, the telephone number from the IMS telephony server, the IMS telephony server being in direct communication with the IMS gateway.

6. The method of claim 1, wherein: receiving the transfer request from the first user includes receiving the transfer request from a computing device of the first user different from the first device.

7. The method of claim 6, wherein the computing device of the first user is associated, at the IMS gateway, with a IMS telephony account of the first user or the computing device of the first user includes an application for accessing the IMS telephony account of the first user.

8. The method of claim 1, wherein: receiving the transfer request from the first user includes receiving the transfer request from the first device of the first user.

9. The method of claim 1, further comprising:
- determining that the file was received at a computing device of the second user; and
- providing, to a messaging address associated with the first user, a confirmation that the file was received at the computing device of the second user.

10. A non-transitory machine-readable medium comprising machine-executable instructions to:
- receive, at an IMS gateway and during an ongoing telephone call established between a first device associated with a first user and a second device associated with a second user, a transfer request to transfer a file from the first user to the second user;
- identify, at the IMS gateway, the second user on the ongoing telephone call, wherein the instructions to identify the second user on the ongoing telephone call include instructions to identify a telephone number associated with the second device; and
- upon identifying the second user and responsive to the transfer request, transfer the file from the first user to the second user, wherein the instructions to transfer the file from the first user to the second user include instructions to:
  - determine, at the IMS gateway, whether the telephone number is associated with a preferred file transfer technique;
  - if the telephone number is associated with the preferred file transfer technique, transfer the file to the second user according to the preferred file transfer technique; and
  - if the telephone number is not associated with the preferred file transfer technique, transfer the file to the second user according to a default file transfer technique;
  - wherein the preferred file transfer technique includes:
    - attempting to push the file to a specific computing device in either a predetermined number of attempts or a predetermined amount of time; and
    - upon failing to push the file to the specified computing device, transmitting the file to an electronic messaging address.

11. The non-transitory machine-readable medium of claim 10, wherein the instructions to identify the second user on the ongoing telephone call include instructions to identify, at the IMS gateway, the second user without receiving identifying information of the second user from the first user.

12. The non-transitory machine-readable medium of claim of claim 10, wherein the instructions to transfer the file to the second user according to the default file transfer technique include instructions to:
- determine, at the IMS gateway, whether the second device being used by the second user to participate in the ongoing telephone call is capable of receiving the file;
- if the second device being used by the second user is capable of receiving the file, send the file to the second device; and
- if the second device being used by the second user is incapable of receiving the file, store the file at a web server and send to the second device a message informing the second user of the stored file and including information for accessing the stored file at the web server.

13. The non-transitory machine-readable medium of claim 10, wherein the preferred file transfer technique associated with the telephone number of the second user is specified within an IMS telephony account of the second user.

14. The non-transitory machine-readable medium of claim 10, wherein the instructions to identify the telephone number associated with the second device include instructions to:

send a request to an IMS telephony server for identifying the telephone number associated with a device in the ongoing telephone communication with the first user receiving, at the IMS gateway, the telephone number from the IMS telephony sever, the IMS telephony server being in direct communication with the IMS gateway.

15. The non-transitory machine-readable medium of claim 10, wherein:
instructions to receive the transfer request from the first user includes instructions to receive the transfer request from a computing device of the first user different from the first device.

16. The non-transitory machine-readable medium of claim 15, wherein the computing device of the first user is associated, at the IMS gateway, with a IMS telephony account of the first user or the computing device of the first user includes an application for accessing the IMS telephony account of the first user.

17. The non-transitory machine-readable medium of claim 10, wherein:
instructions to receive the transfer request from the first user includes instructions to receive the transfer request from the first device of the first user.

18. An IMS gateway comprising:
one or more processors; and
a memory comprising instructions which, when executed by the one or more processors, cause the one or more processors to:
receive, during an ongoing telephone call established between a first device associated with a first user and a second device associated with a second user, a transfer request to transfer a file from the first user to the second user;
identify the second user on the ongoing telephone call, wherein the instructions to identify the second user on the ongoing telephone call include instructions to identify a telephone number associated with the second device; and
upon identifying the second user and responsive to the transfer request, transfer the file from the first user to the second user, wherein the instructions to transfer the file from the first user to the second user include instructions to:
determine whether the telephone number is associated with a preferred file transfer technique;
if the telephone number is associated with the preferred file transfer technique, transfer the file to the second user according to the preferred file transfer technique; and
if the telephone number is not associated with the preferred file transfer technique, transfer the file to the second user according to a default file transfer technique;
wherein the preferred file transfer technique includes:
attempting to push the file to a specific computing device in either a predetermined number of attempts or a predetermined amount of time; and
upon failing to push the file to the specified computing device, transmitting the file to an electronic messaging address.

19. The method of claim 3, wherein determining, at the IMS gateway, whether the second device being used by the second user to participate in the ongoing telephone call is capable of receiving the file comprises:
sending, from the IMS gateway and to the second device, a message inquiring whether the second device is a smartphone;
determining, at the IMS gateway, that the second device is capable of receiving the file in response to receiving a response that the second device is a smartphone; and
determining, at the IMS gateway, that the second device is incapable of receiving the file upon failing to receive a response that the second device is a smartphone.

20. The method of claim 1, wherein the preferred file transfer technique is dependent on a size or a type of the file.

\* \* \* \* \*